(12) United States Patent
Stormberg et al.

(10) Patent No.: US 10,281,096 B2
(45) Date of Patent: May 7, 2019

(54) ILLUMINATION SYSTEM WITH MULTIPLE LIGHT GUIDE LUMINAIRE MODULES

(71) Applicant: Quarkstar LLC, Las Vegas, NV (US)

(72) Inventors: Hans Peter Stormberg, Stolberg (DE); Ingo Speier, Saanichton (CA)

(73) Assignee: Quarkstar LLC, Las Vegas, NV (US)

( * ) Notice: Subject to any disclaimer, the term of this patent is extended or adjusted under 35 U.S.C. 154(b) by 38 days.

(21) Appl. No.: 15/315,333

(22) PCT Filed: May 28, 2015

(86) PCT No.: PCT/US2015/032860
§ 371 (c)(1),
(2) Date: Nov. 30, 2016

(87) PCT Pub. No.: WO2015/187448
PCT Pub. Date: Dec. 10, 2015

(65) Prior Publication Data
US 2017/0114968 A1   Apr. 27, 2017

Related U.S. Application Data

(60) Provisional application No. 62/006,411, filed on Jun. 2, 2014.

(51) Int. Cl.
*F21S 6/00* (2006.01)
*F21V 14/04* (2006.01)
(Continued)

(52) U.S. Cl.
CPC .............. *F21S 6/004* (2013.01); *F21S 6/00* (2013.01); *F21V 14/04* (2013.01); *F21V 21/14* (2013.01); *F21V 21/26* (2013.01); *G02B 6/0045* (2013.01); *G02B 6/0055* (2013.01); *G02B 6/0083* (2013.01); *G02B 6/0085* (2013.01); *F21V 7/005* (2013.01); *F21V 7/0008* (2013.01);
(Continued)

(58) Field of Classification Search
CPC . F21S 6/004; F21S 6/002; F21S 41/24; F21V 21/26; F21V 14/02; G02B 6/0055
See application file for complete search history.

(56) References Cited

U.S. PATENT DOCUMENTS 8,573,823 B2 * 11/2013 Dau .................... G02B 6/0045
                                                         362/222
2012/0268966 A1   10/2012 McCollum et al.
(Continued)

FOREIGN PATENT DOCUMENTS

EP         1739342 A2 *  1/2007  ............. F21S 6/003
WO    WO2012131560 A1   10/2012

OTHER PUBLICATIONS

International Application No. PCT/US2015/032860, Notification of Transmittal of the International Search Report and the Written Opinion of the International Searching Authority, dated Aug. 25, 2015, 10 pages.

*Primary Examiner* — Karabi Guharay
(74) *Attorney, Agent, or Firm* — Fish & Richardson P.C.

(57) ABSTRACT

A standing lamp includes a stand; first and second luminaire modules, each comprising a plurality of light emitting elements (LEEs) distributed along a first direction, a light guide and a housing configured to house at least the LEEs and to support the light guide; and a mount attaching the first and second luminaire modules to the stand.

23 Claims, 9 Drawing Sheets

(51) Int. Cl.
*F21V 21/14* (2006.01)
*F21V 8/00* (2006.01)
*F21V 21/26* (2006.01)
*F21V 7/00* (2006.01)
*F21Y 113/00* (2016.01)
*F21Y 103/10* (2016.01)
*F21Y 115/10* (2016.01)

(52) U.S. Cl.
CPC ....... *F21Y 2103/10* (2016.08); *F21Y 2113/00* (2013.01); *F21Y 2115/10* (2016.08); *G02B 6/002* (2013.01); *G02B 6/0031* (2013.01)

(56) References Cited

U.S. PATENT DOCUMENTS

| | | | |
|---|---|---|---|
| 2012/0281432 A1 | 11/2012 | Parker et al. | |
| 2013/0039050 A1* | 2/2013 | Dau | G02B 6/0045 362/218 |
| 2014/0126235 A1 | 5/2014 | Speier et al. | |

\* cited by examiner

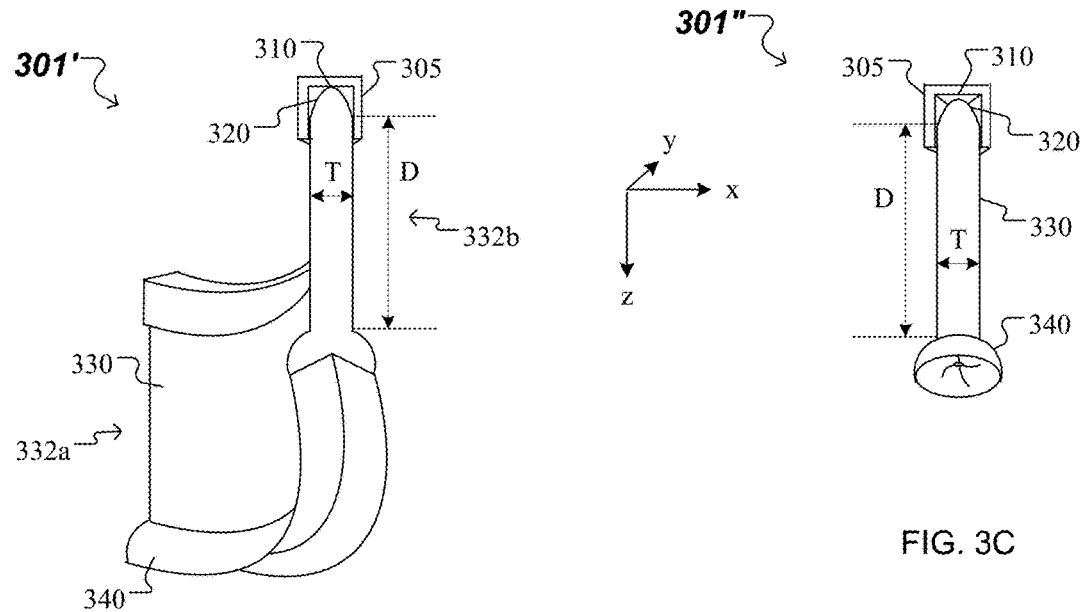
FIG. 3B
FIG. 3C
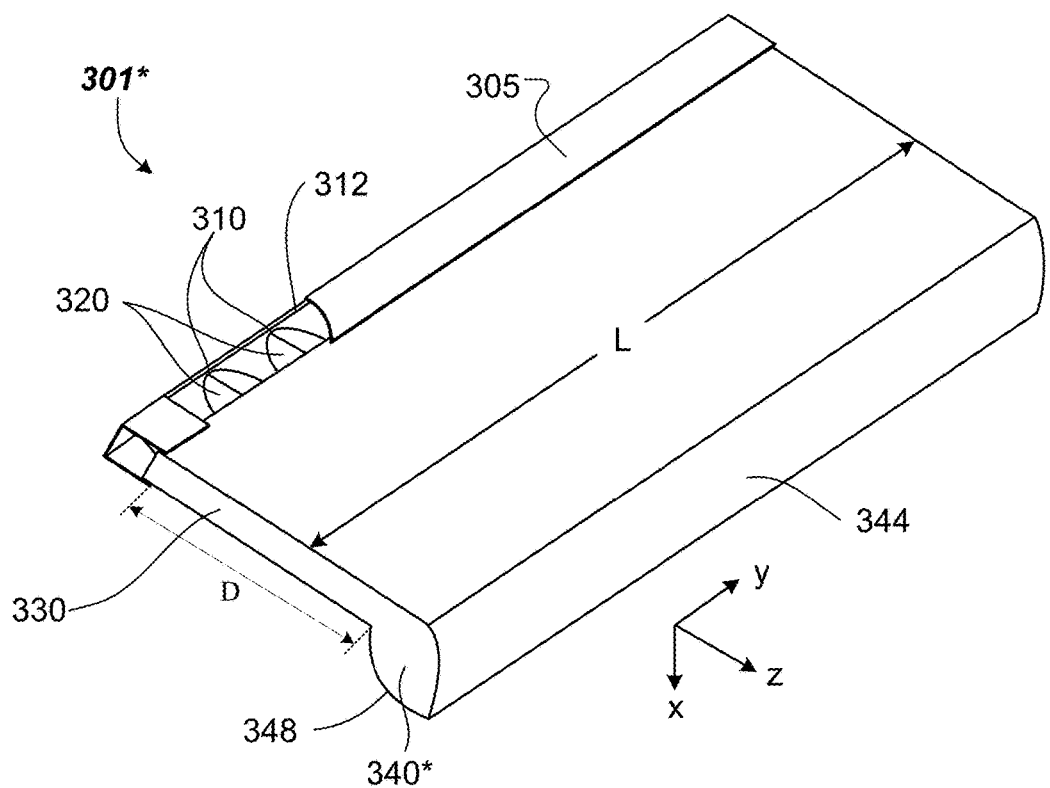
FIG. 3E

ILLUMINATION SYSTEM WITH MULTIPLE LIGHT GUIDE LUMINAIRE MODULES

CROSS-REFERENCE TO RELATED APPLICATIONS

This application is a U.S. National Phase application of International Application No. PCT/US2015/032860, filed on May 28, 2015, which claims the benefit of priority under 35 U.S.C. § 119(e)(1) of U.S. Provisional Application No. 62/006,411, filed on Jun. 2, 2014 which is incorporated by reference herein.

TECHNOLOGICAL FIELD

The present technology relates to illumination systems with multiple luminaire modules, and more particularly to a standing lamp with multiple light guide luminaire modules.

BACKGROUND

Light sources are used in a variety of applications, such as for providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

Examples of illumination systems are disclosed in which each illumination system includes multiple luminaire modules supported by a stand. As such, the disclosed illumination systems are referred to as standing lamps. Here, each luminaire module includes solid state light sources, e.g., LEDs, and a light guide. The light guide is arranged and configured such that light emitted by the solid state light sources is edge-coupled at one end of the light guide, guided along a length of the light guide and issued at an opposing end of the light guide. Mounting elements used to mount the luminaire modules onto the stand may have one or more degrees of freedom for positioning and/or orienting the luminaire modules relative to each other and/or relative to a stand.

Among other advantages, the disclosed standing lamps may be energy efficient, low profile, and/or adjustable to provide a variety of different lighting profiles (e.g., focused task or reading light, or general lighting).

Various aspects of the invention are summarized as follows.

In general, in a first aspect, a standing lamp includes: a stand comprising a base and column; first and second luminaire modules, each including a plurality of light emitting elements (LEEs) distributed along a first direction, a light guide extending along the first direction, the light guide comprising an input end and an output end, and two opposing side surfaces extending from the input end to the output end in a second direction orthogonal to the first direction, one or more optical couplers configured to couple light from the LEEs into the input end of the light guide, an optical extractor optically coupled to the output end of the light guide to receive light guided by the side surfaces of the light guide in the second direction, the optical extractor comprising a redirecting surface that is positioned to reflect at least some light from the light guide into a first angular range, and a housing configured to house at least the LEEs and to support the light guide; and a mount operatively coupling the first and second luminaire modules with the stand.

Embodiments of the illumination system may include one or more of the following features and/or features of other aspects. In some implementations, the standing lamp can include a mounting arm having first and second ends, the first end being attached to the mount and the second end being attached to the stand. In other implementations, the mount can be coupled directly to the stand.

In some implementations, the housing of each luminaire module can be connected to the mount. In some implementations, the mount can be an adjustable mount configured to provide adjustment of at least one of the first and second luminaire modules. For example, the adjustable mount allows for rotation of both the first and second luminaire modules about a respective axis. As another example, the adjustable mount allows for translation of both the first and second luminaire modules along a respective axis. In either of these examples, the axis for each luminaire module is parallel to the first direction. In the former of these examples, the axis for each luminaire module is parallel to the second direction.

In some implementations, the optical extractor of each luminaire module can include an output surface with a curved cross-section, the output surface arranged and configured to transmit the light in the first angular range to the ambient environment. For example, the optical extractor of each luminaire module can be a single-sided optical extractor. As another example, the optical extractor of each luminaire module can be a double-sided optical extractor that further includes a second redirecting surface which forms together with the redirecting surface a v-groove surface, the v-groove surface positioned with its apex facing the output end of the light guide, such that the second redirecting surface reflects at least some light from the light guide into a fourth angular range, and a second output surface with a curved cross-section, the second output surface arranged and configured to transmit the light in the fourth angular range to the ambient environment.

In some implementations, the first angular range can have a component of a prevalent propagation direction that is antiparallel to the second direction. Here, the redirecting surface of the optical extractor of each luminaire module is a partially transmitting surface, such that at least a portion of the light from the light guide is transmitted through the redirecting surface in a second angular range that has a component of a prevalent propagation direction that is parallel to the second direction. Further, the optical extractor of each luminaire module can be located between the LEEs and the base of the stand, and the light in the first angular range indirectly illuminates a target surface located between the optical extractor and the base of the stand and the light in the second angular range directly illuminates the target surface.

In some implementations, the first angular range can have a component of a prevalent propagation direction that is antiparallel to the second direction. Here, the standing lamp can include a reflector mount coupled with the housing of the first luminaire module, and a reflector coupled with the reflector mount and arranged to intercept light from the extractor of the first luminaire module in the first angular range and configured to reflect the intercepted light in a third angular range that has a component of a prevalent propagation direction that is parallel to the second direction. Moreover, the reflector mount can be an adjustable reflector mount configured to provide adjustment of the reflector relative to the light guide of the first luminaire module. For example, the adjustable reflector mount allows for rotation of the reflector about an axis parallel to the first direction. As another example, the adjustable reflector mount can allow for translation of the reflector along an axis parallel to the second direction.

Additionally in this case, the optical extractor of each of the first and second luminaire modules is a double-sided optical extractor that outputs light in the first angular range and in a second angular range, each of the first and second angular ranges having a component of a prevalent propagation direction that is antiparallel to the second direction and another component antiparallel with each other, and the standing lamp can include three additional reflector mounts, two of the reflector mounts coupled with the housing of the first luminaire module on opposing sides of the light guide of the first luminaire module and two of the reflector mounts coupled with the housing of the second luminaire module on opposing sides of the light guide of the second luminaire module, and three additional reflectors and respective reflector mounts, two of the reflectors associated with each luminaire module arranged to intercept light from the extractor of the luminaire module in the first angular range and configured to reflect the intercepted light in the third angular range that has a component of a prevalent propagation direction that is parallel to the second direction and two of the reflectors arranged to intercept the light from the extractor of the luminaire module in the second angular range and configured to reflect the intercepted light in a fourth angular range that has a component of a prevalent propagation direction that is parallel to the second direction and the other components of the prevalent propagation directions in the third and fourth angular ranges being antiparallel to each other.

Further in this case, the LEEs are located between the optical extractor and the base of the stand, and the light in the third angular range indirectly illuminates a target surface located between the optical extractor and the base of the stand.

In some implementations, the opposing side surfaces of the light guide can be planar. In some implementations, the opposing side surfaces of the light guide can be parallel. In some implementations, the LEEs can be light-emitting diodes (LEDs). For example, the LEEs are LEDs configured to emit white light. In some implementations, each luminaire module extends between about six inches and 48 inches in the first direction.

BRIEF DESCRIPTION OF THE DRAWINGS

FIGS. 3A-3E show aspects of light guide luminaire modules of the first and second types.

Like elements in different figures are identified with the same reference numeral.

DETAILED DESCRIPTION

Figure 1A:
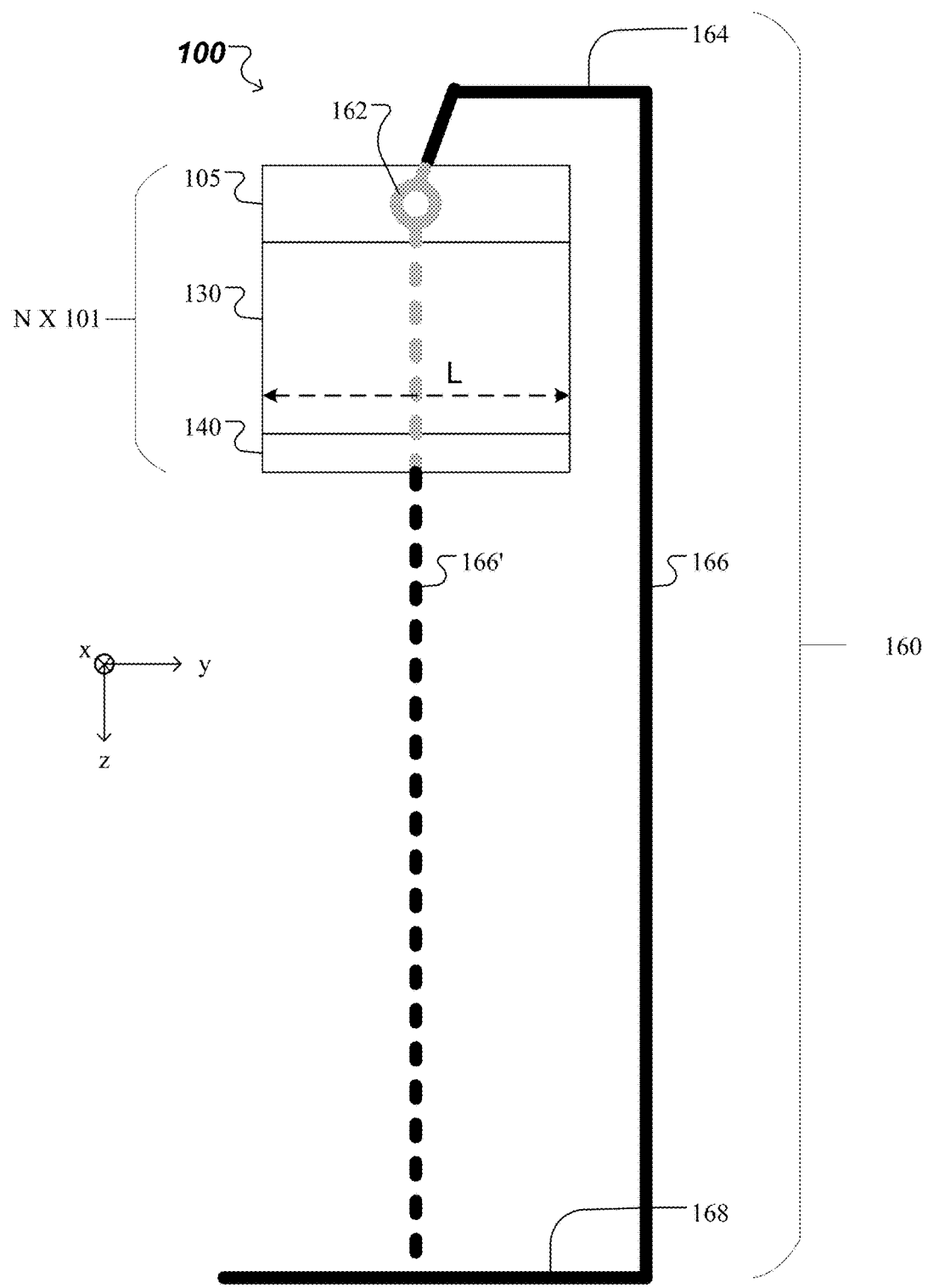
FIG. 1A is a side view of an example of an illumination system, referred to as a standing lamp, in which one or more light guide luminaire modules are supported on a stand.

FIG. 1A is a side view of an example of an illumination system 100, also referred to as a standing lamp 100. The standing lamp 100 includes a number N of luminaire modules 101, a stand 160, and an adjustable mount 162, where N≥1. The one or more luminaire modules 101 are supported by the stand 160 and are attached thereon through the adjustable mount 162.

In the example illustrated in FIG. 1A, each of the luminaire modules 101 includes a linear array of light emitting elements (LEEs), optical couplers, a light guide 130 and an optical extractor 140.

In general, the LEEs are devices that emit light in a region or combination of regions of the electromagnetic spectrum that includes the visible region, infrared and/or ultraviolet region, when activated, e.g., by applying a potential difference across it or passing a current through it. The LEEs may have monochromatic, quasi-monochromatic, polychromatic or broadband spectral emission characteristics. Examples of LEEs include semiconductor, organic, or polymer/polymeric light-emitting diodes (LEDs), optically pumped phosphor coated LEDs, optically pumped nano-crystal LEDs or any other similar LEDs. Furthermore, the term light-emitting element is used to define the specific device that emits the radiation, for example a LED die, and can equally be used to define a combination of the specific device that emits the radiation together with a package within which the specific device or devices are placed. Examples of light emitting elements include also lasers and more specifically semiconductor lasers, such as VCSEL (Vertical cavity surface emitting lasers) and edge emitting lasers. Further examples may include superluminescent diodes and other superluminescent devices.

The optical couplers are arranged and configured to direct light from the LEEs into the light guide 130, which in turn guides the light from the optical couplers to the optical extractor 140 in a forward direction (parallel to an optical axis of the light guide 130, e.g., parallel to the z-axis). Moreover, the optical extractor 140 outputs the guided light into an ambient environment as output light. The optical extractor 140 is configured to direct the output light into one or more output angular ranges. At least one of the angular ranges is a backward output angular range (in which light propagates along a prevalent direction with a component antiparallel to the optical axis of the light guide 130). In some implementations, at least some of the light output by the optical extractor 140 is output in a forward output angular range (in which light propagates along a prevalent direction with a component parallel to the optical axis of the light guide 130). As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. (See, e.g., light intensity distribution 303 in FIG. 3E.) For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

Referring again to FIG. 1A, each of the luminaire modules 101 extends along a direction orthogonal to the optical axis of its light guide 130, e.g., along the y-axis, over a length L. The length of each of the luminaire modules 101 can be L=1 foot, 2 feet, or other values.

In this example, each of the luminaire modules 101 also includes a housing (or rail) 105. The LEEs and optical couplers are located inside the housing 105. In some implementations, the housing 105 also includes circuitry for supplying power to the LEEs. In addition, the housing 105 can be configured to support the light guide 130, and at least a portion of the housing can be configured as a heat sink for extracting heat generated by the LEEs.

In some implementations, the stand 160 can include a base 168, a column 166, and a mounting arm 164. Here, the one or more luminaire modules 101 are attached to the mounting arm 164 via the adjustable mount 162. In other implementations, the stand 160 lacks the mounting arm 164. Here, the one or more luminaire modules 101 are attached to the column 166' via the adjustable mount 162.

The base 168 is configured to stabilize the standing lamp 100 while it stands on the floor. The column 166/166' is designed to be tall enough to position the optical extractor 140 of each of the luminaire modules 101 at a desired height above the floor, e.g., 3-6 feet. The column 166/166' may have an adjustable height, e.g., it can be a telescoping column. The mounting arm 164 can be attached at or near the top of the column 166 and is designed to be sufficiently long to position the each of the luminaire modules 101 away from the column 166. For example, where the luminaire modules 101 are two feet long, the mounting arm 164 may be in the range of one foot to two feet long and connect to the middle of a luminaire module. The mounting arm 164 may be adjustable in length.

The adjustable mount 162 allows one to adjust various degrees of freedom of the position and orientation of the one or more luminaire modules 101 relative to the stand 160. For example, the adjustable mount 162 can allow for rotating of each luminaire module 101 about an axis parallel to the stand 160 (e.g., by an angle δθ about the z-axis). Alternatively, or additionally, the adjustable mount 162 may allow for rotation of each luminaire module 101 about an axis parallel to the direction of the linear array of LEDs (e.g., by an angle δφ about the y-axis).

Figure 1B:
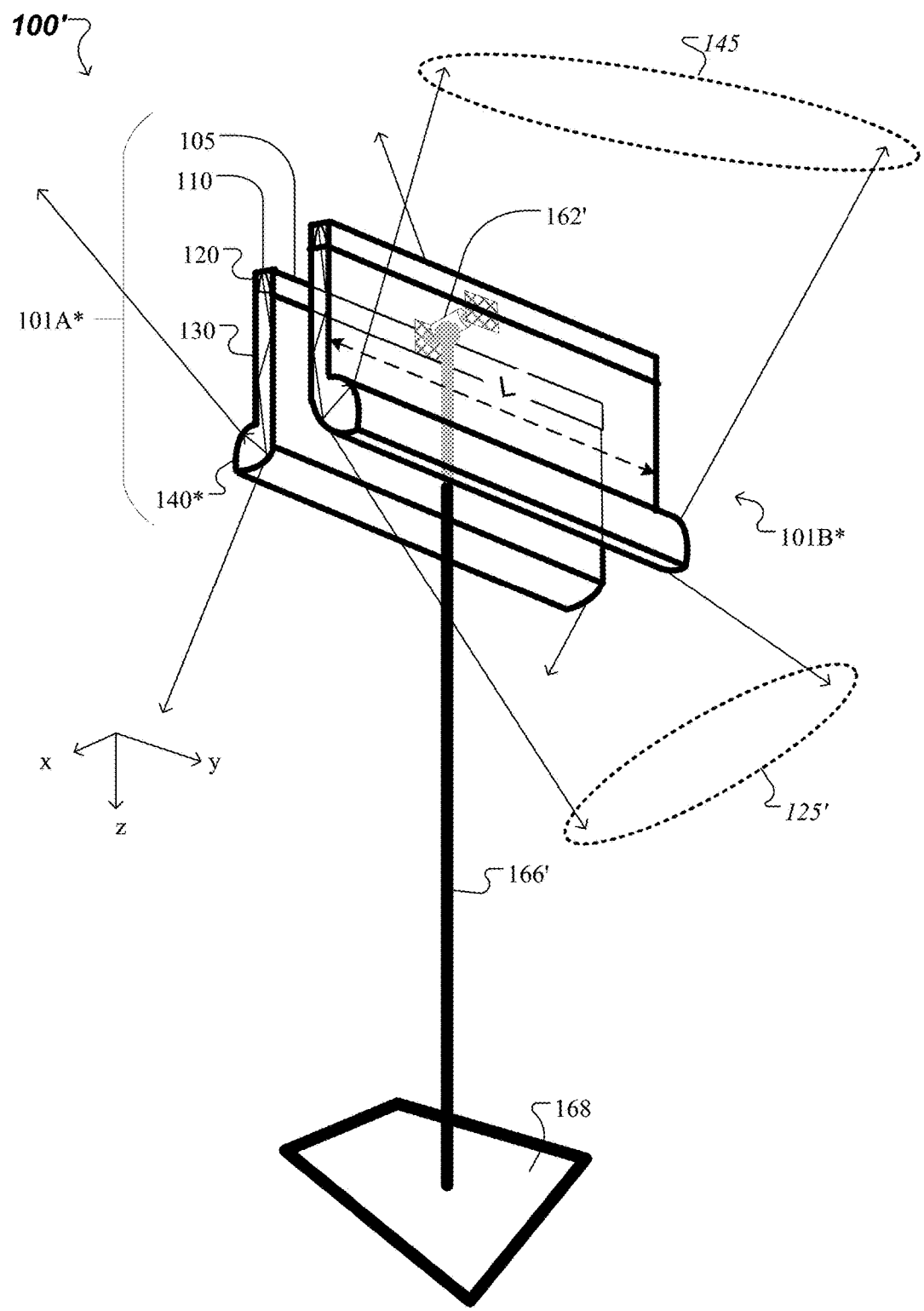
FIG. 1B is a perspective view of a standing lamp that includes multiple light guide luminaire modules of a first type.

FIG. 1B shows a standing lamp 100' that includes multiple luminaire modules. The standing lamp 100' is an example implementation of the standing lamps 100 described above in connection with FIG. 1A. In the example illustrated in FIG. 1B, the standing lamp 100' includes two luminaire modules 101A*, 101B*, a stand with a base 168 and a column 166', and an adjustable mount 162'. Here, the luminaire modules 101A*, 101B* are supported by the column 166' through the adjustable mount 162'.

In this example, each of the luminaire modules 101A* and 101B* includes a linear array of LEEs 110, optical couplers 120, a light guide 130 and an optical extractor 140*. Further, each of the luminaire modules 101A* and 101B* also includes a housing 105. The LEEs 110 and optical couplers 120 are located inside the housing 105. Additionally, the housing 105 also supports the light guide 130, and provides a heat sink for extracting heat generated by the LEEs 110. Here, each of the luminaire modules 101A* and 101B* extends along a direction orthogonal to the optical axis of its light guide 130, e.g., along the y-axis, over a length L. The length of each of the luminaire modules 101A* and 101B* can be L=1 foot, 2 feet, or other values.

Moreover, the housing 105 of the luminaire module 101A* can be attached to the adjustable mount 162' at a first coupling point and the housing of the luminaire module 101B* can be attached to the adjustable mount at a second coupling point spaced apart from the first coupling point. In the example illustrated in FIG. 1B, the housing 105 of the luminaire module 101A* is attached at one end of the adjustable mount 162' and the housing of the luminaire module 101B* is attached at the opposing end of the adjustable mount. The adjustable mount 162' is configured to provide multiple translational and rotational degrees of freedom for repositioning and reorienting the luminaire modules 101A* and 101B* with respect to the column 166' and with respect to each other, as described below in connection with FIGS. 2A-2B.

Referring again to FIG. 1B, for each luminaire module 101A*/101B*, the optical couplers 120 are arranged and configured to direct light from the LEEs 110 into the light guide 130, which in turn guides the light from the optical couplers to the optical extractor 140* in a forward direction (parallel to an optical axis of the light guide 130, e.g., parallel to the z-axis). Moreover, the optical extractor 140* of the luminaire module 101A*/101B* outputs the guided light into an ambient environment as output light of the luminaire module 101A*/101B*. Here, the optical extractor 140* is configured as a single-sided optical extractor that outputs at least some of the guided light into a backward output angular range 145 on a single side of the light guide 130. In this manner, an intensity distribution of the light output by the luminaire module 101A*/101B* —having a single-sided optical extractor 140* and a light guide 130—is asymmetric relative to a plane parallel to side surfaces of the light guide.

For the example of standing lamp 100' illustrated in FIG. 1B, the luminaire modules 101A* and 101B* are arranged relative to each other in a back-to-back setup, such that the luminaire module 101A* is attached to the adjustable mount 162' spaced apart from and facing opposite the luminaire module 101B*. In this manner, output light of the luminaire module 101A* is issued in a backward output angular range on one side of the lamp 100' (e.g., on the left side) and output light of the luminaire module 101B* is issued in another backward output angular range 145 on another, opposing side of the lamp 100' (e.g., on the right side).

In some implementations, the single-sided optical extractor 140* of the luminaire module 101A*/101B* is configured to "leak" guided light in a forward angular range 125'. For example, an intensity of the light leaked by the single-sided optical extractor 140* in the forward output angular range 125' can be much smaller than the intensity of the light output by the single-sided optical extractor in the backward output angular range 145. As another example, the intensity of the light issued by the single-sided optical extractor 140\*
in the forward output angular range 125' can be much larger
than the intensity of the light output by the single-sided
optical extractor in the backward output angular range 145.
As yet another example, the intensity of the light issued by
the single-sided optical extractor 140\* in the forward output
angular range 125' can be about the same as the intensity of
the light output by the single-sided optical extractor in the
backward output angular range 145.

As each of the luminaire modules 101A\* and 101B\* of
the standing lamp 100' has its extractor 140\* located
between its LEEs 110 and the base 168 of the stand, the
standing lamp 100' illuminates a target surface placed
between the extractor and the base directly, with light issued
in the forward output angular range 125', and indirectly, with
light issued in the first and second backward output angular
range 145 and 145'.

Other luminaire modules, e.g., luminaire modules having
a double-sided optical extractor and a light guide, can be
used to design standing lamps, as described below.

Figure 1C:
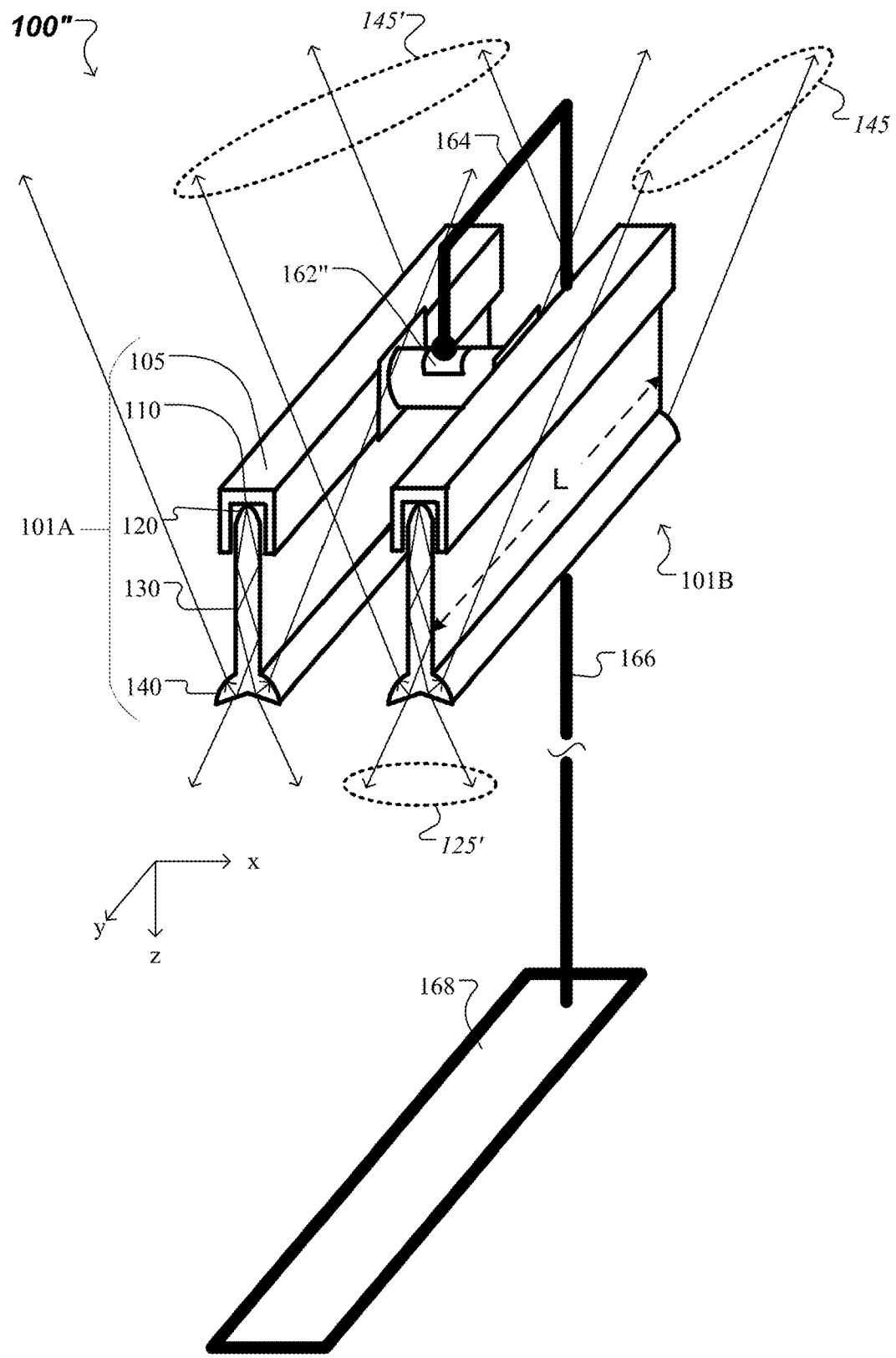
FIG. 1C is a perspective view of a standing lamp that includes multiple light guide luminaire modules of a second type.

FIG. 1C shows another standing lamp 100" that includes
multiple luminaire modules. The standing lamp 100" is
another example implementation of the standing lamps 100
described above in connection with FIG. 1A. The standing
lamp 100" includes two luminaire modules 101A, 101B, a
stand with a base 168 and a column 166 and a mounting arm
164, and an adjustable mount 162". Here, the luminaire
modules 101A, 101B are supported by the mounting arm
164 through the adjustable mount 162". As described further
below, each luminaire module 101A/B includes a light guide
and is configured to emit light on both sides of the light
guide.

In this example, each of the luminaire modules 101A and
101B includes a linear array of LEEs 110, optical couplers
120, a light guide 130 and an optical extractor 140. Further,
each of the luminaire modules 101A and 101B also includes
a housing 105. The LEEs 110 and optical couplers 120 are
located inside the housing 105. Additionally, the housing
105 also supports the light guide 130, and provides a heat
sink for extracting heat generated by the LEEs 110. Here,
each of the luminaire modules 101A and 101B extends along
a direction orthogonal to the optical axis of its light guide
130, e.g., along the y-axis, over a length L. The length of
each of the luminaire modules 101A and 101B can be L=1
foot, 2 feet, or other values.

Figure 2A:
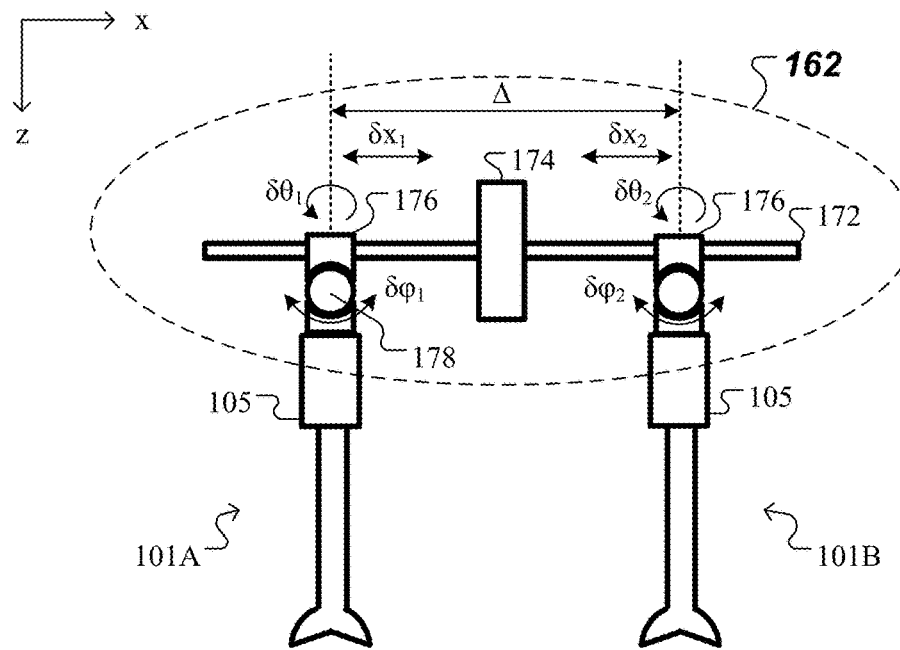
FIGS. 2A-2B show aspects an example of an adjustable mount used in a standing lamp, e.g., like the ones shown in FIGS. 1A-1C to adjustably support one or more light guide luminaire modules onto a stand.

Moreover, the housing 105 of the luminaire module 101A
can be attached to the adjustable mount 162" at a first
coupling point and the housing of the luminaire module
101B can be attached to the adjustable mount at a second
coupling point spaced apart from the first coupling point by
a separation Δ (see, e.g., FIG. 2A). In the example illustrated
in FIG. 1C, the housing 105 of the luminaire module 101A
is attached at one end of the adjustable mount 162" and the
housing of the luminaire module 101B is attached at the
opposing end of the adjustable mount. The adjustable mount
162" is configured to provide multiple translational and
rotational degrees of freedom for repositioning and reorienting the luminaire modules 101A and 101B with respect to
the mounting arm 164 and with respect to each other, as
described below in connection with FIGS. 2A-2B.

For each luminaire module 101A/101B, the optical couplers 120 are arranged and configured to direct light from the
LEEs 110 into the light guide 130, which in turn guides the
light from the optical couplers to the optical extractor 140 in
a forward direction (parallel to an optical axis of the light
guide 130, e.g., parallel to the z-axis). Moreover, the optical
extractor 140 of the luminaire module 101A/101B outputs
the guided light into an ambient environment as output light
of the luminaire module 101A/101B. Here, the optical
extractor 140 is configured as a double-sided optical extractor that outputs at least some of the guided light into a first
backward output angular range 145 on one side of the light
guide 130 (e.g., the left side) and into a second backward
output angular range 145' on the other, opposing side of the
light guide (e.g., the right side). In this manner, an intensity
distribution of the light output by the luminaire module
101A/101B—having a double-sided optical extractor 140
and a light guide 130—can be symmetric or asymmetric
relative to the y-z plane parallel to side surfaces of the light
guide.

For the example of standing lamp 100" illustrated in FIG.
1C, the separation Δ between the luminaire modules 101A
and 101B, each having a double-sided optical extractor 140,
is adjusted such that output light of the luminaire module
101A issued in a first backward output angular range can
clear the housing of the luminaire module 101B, and output
light of the luminaire module 101B issued in a second
backward output angular range 145' can clear the housing of
the luminaire module 101A. In addition, output light of the
luminaire module 101A is issued in a second backward
output angular range on one side of the lamp 100" (e.g., on
the left side) and output light of the luminaire module 101B
is issued in a first backward output angular range 145 on
another, opposing side of the lamp 100" (e.g., on the right
side).

In some implementations, the double-sided optical extractor 140 of the luminaire module 101A/101B is configured to
"leak" guided light in a forward angular range 125'. For
example, an intensity of the light leaked by the double-sided
optical extractor 140 in the forward output angular range
125' can be much smaller than the intensity of the light
output by the double-sided optical extractor in either of the
first backward output angular range 145 or the second
backward output angular range 145'. As another example,
the intensity of the light issued by the double-sided optical
extractor 140 in the forward output angular range 125' can
be much larger than the intensity of the light output by the
double-sided optical extractor in either of the first backward
output angular range 145 or the second backward output
angular range 145'. As yet another example, the intensity of
the light issued by the double-sided optical extractor 140 in
the forward output angular range 125' can be about the same
as the intensity of the light output by the double-sided
optical extractor in either of the first backward output
angular range 145 or the second backward output angular
range 145'.

As each of the luminaire modules 101A and 101B of the
standing lamp 100" has its extractor 140 located between its
LEEs 110 and the base 168 of the stand, this standing lamp
illuminates a target surface placed between the extractor and
the base directly, with light issued in the forward output
angular range 125', and indirectly, with light issued in the
first and second backward output angular ranges 145 and
145'.

Adjustable mounts with multiple degrees of freedom for
repositioning luminaire modules (e.g., **101A\*/101B\*** or
101A/101B) within a standing lamp (e.g., 100, 100' and
100") and with respect to each other are described below.

Figure 2B:
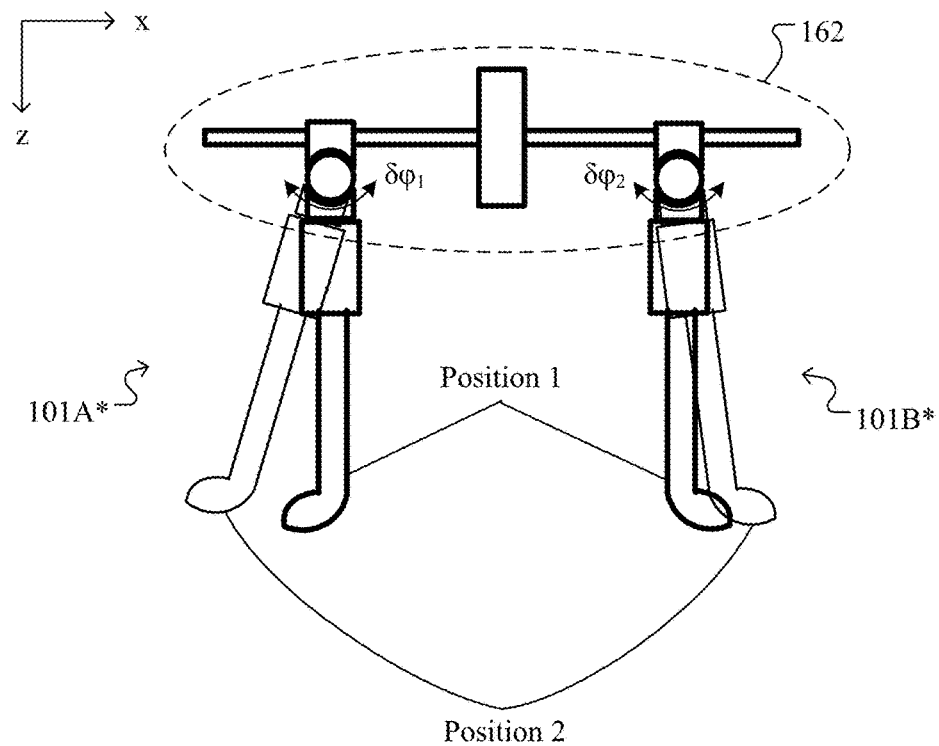

FIGS. 2A and 2B show aspects of an example of an
adjustable mount 162 used in a standing lamp, e.g., like
standing lamps 100, 100' and 100" shown above in FIGS.
1A, 1B and 1C, respectively. In the example shown in FIG.
2A, the adjustable mount 162 adjustably supports luminaire
modules 101A and 101B as part of standing lamp 100" or as part of a similar standing lamp. In the example shown in FIG. 2B, the adjustable mount 162 adjustably supports luminaire modules 101A\* and 101B\* as part of standing lamp 100' or as part of a similar standing lamp.

Here, the adjustable mount 162 includes a mounting bar 172, a mount connector 174 and one or more housing connectors 176. The mounting bar 172 can be attached to the mounting arm 164, as in the case of standing lamp 100", or to the column 166', as in the case of standing lamp 100', using bolts, nuts, washers (or other fasteners).

Each of the housing connectors 176 is used to connect a housing 105 of a respective luminaire module 101A/101B or a luminaire module **101A\*/101B\* to the mounting bar 172. In this example, each of the housing connectors 176 is translatable along the mounting bar 172. In some implementations, translational actuators can be used to translate a housing connector 176 that supports luminaire module 101A by a lateral displacement $\delta x_1$ and another housing connector that supports luminaire module 101B by the same or another lateral displacement $\delta x_2$ with respect to the mount connector 174. In other implementations, a distance Δ between the housing connector 176 that supports luminaire module 101A and the housing connector that supports luminaire module 101B** can be adjusted as necessary.

In addition, each of the housing connectors 176 includes a pivot 178 with one or more rotational degrees of freedom. In some implementations, the pivot 178 allows to rotate each of the luminaire modules 101A/101B or **101A\*/101B\* by a respective polar displacement $\delta\varphi_1/\delta\varphi_2$ around a rotation axis parallel to the y-axis. In some implementations, the pivot 178 allows to rotate each of the luminaire modules 101A/101B or 101A\*/101B\* by a respective azimuthal displacement $\delta\theta_1/\delta\theta_2$ around an azimuthal rotation axis parallel to the z-axis. In some implementations, both polar displacements $\delta\varphi$ and azimuthal displacements $\delta\theta$ can be applied to each luminaire module 101A/101B or 101A\*/101B\* either with respect to an absolute rotational reference, or with respect to each other. In either of the foregoing implementations, rotational actuators can be used to cause the polar displacements $\delta\varphi_1/\delta\varphi_2$ or the azimuthal displacement $\delta\theta_1/\delta\theta_2$ of each of the luminaire modules 101A/101B or 101A\*/101B\*. In some implementations, the housing connectors 176 may be configured further to allow rotation about the mounting bar 172**.

FIG. 2B shows the luminaire modules 101A\* and 101B\* of the standing lamp 100' in a first position, denoted Position 1, and in a second position, denoted Position 2. In Position 1, respective light guides of the luminaire modules 101A\* and 101B\* have optical axes parallel to each other (and with the z-axis.) In Position 2, the optical axis of the light guide of the luminaire module 101A\* has been rotated about the y-axis by a polar displacement $\delta\varphi_1$, and the optical axis of the light guide of the luminaire module 101B\* has been rotated about the y-axis by a polar displacement $\delta\varphi_2$. Equivalently, in Position 2, the optical axis of the light guide of the luminaire module 101A\* has been rotated about a rotation axis parallel to the y-axis by a polar displacement $\delta\varphi_1+\delta\varphi_2$ relative to the optical axis of the light guide of the luminaire module 101B\*.

Details of structural and functional aspects of the luminaire modules used in the standing lamps 100/100'/100" are described below.

Figure 3A:
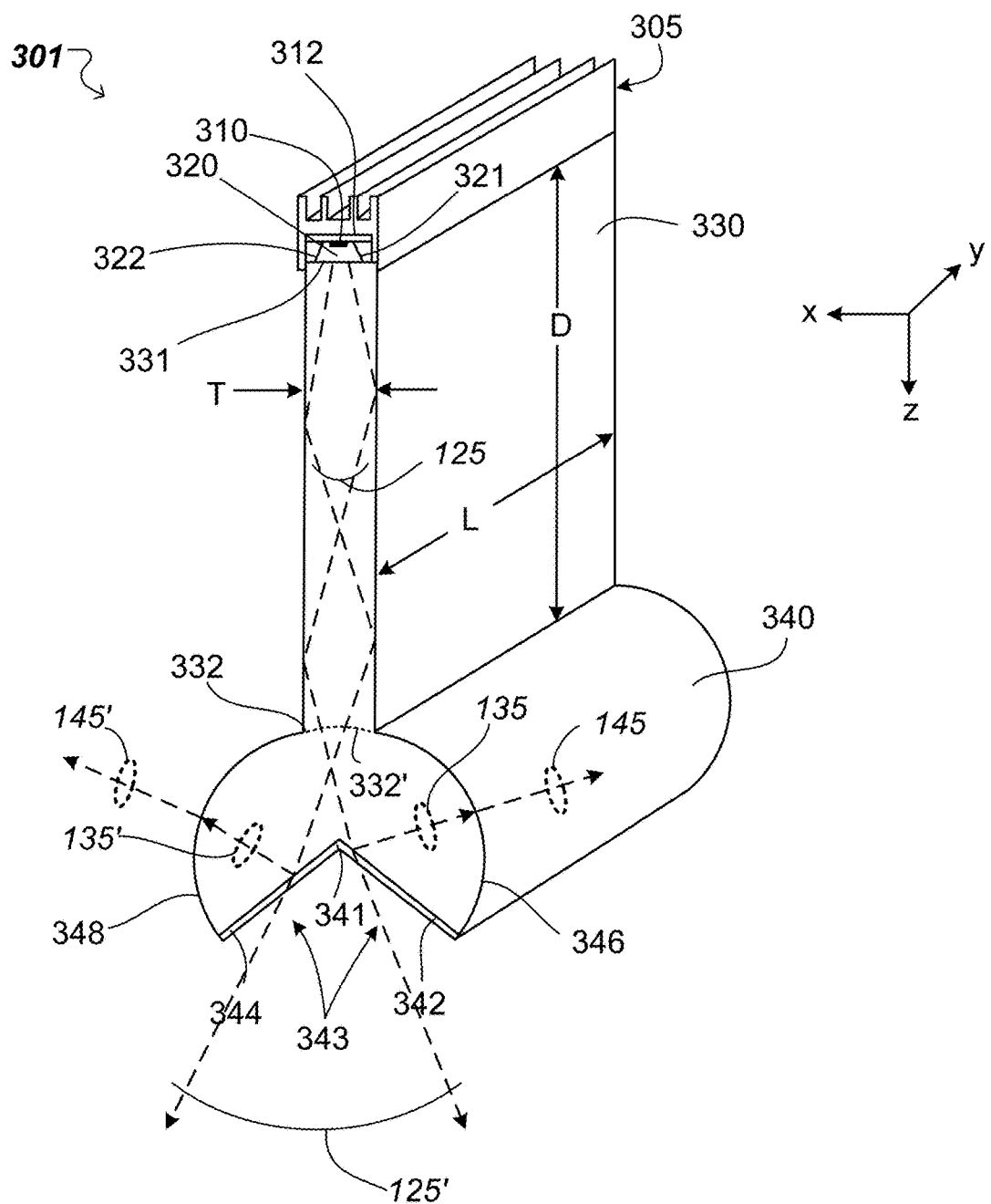

Referring to FIG. 3A, in which a Cartesian coordinate system is shown for reference, a luminaire module 301 includes a substrate 312 having a plurality of LEEs 310 distributed along a first surface of the substrate 312. The substrate 312 with the LEEs 310 is affixed to a housing 305 and is coupled with a first (e.g., upper) edge 331 of a light guide 330. Here, the positive z-direction is referred to as the "forward" direction and the negative z-direction is the "backward" direction. Sections through the luminaire module 301 parallel to the x-z plane are referred to as the "cross-section" or "cross-sectional plane" of the luminaire module. Also, luminaire module 301 extends along the y-direction, so this direction is referred to as the "longitudinal" direction of the luminaire module. Implementations of luminaire assemblies can have a plane of symmetry parallel to the y-z plane, be curved or otherwise shaped. This is referred to as the "symmetry plane" of the luminaire module.

Multiple LEEs 310 are disposed on the first surface of the substrate 312, although only one of the multiple LEEs 310 is shown in FIG. 3A. For example, the plurality of LEEs 310 can include multiple white LEDs. The LEEs 310 are optically coupled with one or more optical couplers 320 (only one of which is shown in FIG. 3A). An optical extractor 340 is disposed at second (e.g., lower) edge 332 of light guide 330.

Substrate 312, light guide 330, and optical extractor 340 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 3 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 310 on the substrate 312 will generally depend, inter alia, on the length L, where more LEEs are used for longer luminaire assemblies. In some implementations, the plurality of LEEs 310 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 301 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. The luminaire module 301 can include one or multiple types of LEEs, for example one or more subsets of LEEs in which each subset can have different color or color temperature.

The substrate 312 provides a base layer on which the LEEs 310 and electrical conductors for delivering electrical power to the LEEs can be mounted. The LEEs 310 are secured to substrate 312, e.g., by solder and/or an adhesive. In general, the LEEs are secured to the substrate such that the LEEs move with the substrate as the substrate expands or contracts with thermal changes.

Typically, the substrate 312 is formed, at least in part, from a rigid material. In some embodiments, the substrate 312 includes a printed circuit board (PCB). For example, the substrate 312 can include a board or boards that mechanically support and electrically connect electronic components using conductive tracks, pads and other features etched from copper sheets laminated onto a non-conductive substrate. PCBs can be single sided (e.g., one copper layer), double sided (e.g., two copper layers) or multi-layer. Conductors on different layers can be connected with plated-through holes or vias. In some embodiments, PCBs may contain components—capacitors, resistors or active devices—embedded in the substrate. Examples of PCB's include metal core printed circuit boards (MCPCBs), glass-epoxy laminates (e.g., FR-4) PCBs, ceramic PCBs, flexible circuits boards and a rigid circuit board with flexible interconnects Alternatively, or additionally, in certain embodiments, the substrate 312 includes flexible electronics—also known as flex circuits—which include electronic devices mounted on flexible plastic substrates, such as polyimide, PEEK or transparent conductive polyester film.

Optical couplers 320 may also be secured to the substrate 312. For example, in some embodiments, the optical coupling elements are bonded to the substrate using, e.g., an adhesive, such as an epoxy adhesive.

In general, the LEEs 310 may be coupled to their corresponding optical couplers 320 in a variety of ways. In some embodiments, particularly where the optical couplers 320 are formed from a solid transparent material, the LEEs 310 may be optically coupled to their optical coupling elements using a medium (e.g., a solid, liquid, or gel) with suitable adhesion, cohesion and chemical properties that has a refractive index similar to the refractive index of the material from which the optical element is formed. Examples of such media include silicone (e.g., a single part or dual-part compound, e.g., thermally or UV curable) or epoxy. In certain embodiments, where no medium is used, a gap may exist between the surface of the light emitting element and the optical coupling elements.

As noted above, the optical coupler 320 can include one or more solid pieces of transparent optical material (e.g., a glass material or a transparent organic plastic, such as polycarbonate or acrylic) having surfaces 321 and 322 positioned to reflect light from the LEEs 310 towards the light guide 330. In general, surfaces 321 and 322 are shaped to collect and at least partially collimate light emitted from the LEEs. As such, the optical coupler 320 receives light emitted by the LEEs 310 within an emission angular range and provides light within a second angular range 125 to the receiving end 331 of the light guide 330. The coupler 320 is shaped to transform the emission angular range into the second angular range 125 via total internal reflection, specular reflection or both. Here, the divergence of the second angular range 125 is smaller than the divergence of the emission angular range, such that all light provided by the coupler 320 in the angular range 125 can be injected into the light guide 330 at its receiving end 331.

In the x-z cross-sectional plane, surfaces 321 and 322 of the optical coupler 320 can be straight or curved. Examples of curved surfaces include surfaces having a constant radius of curvature, parabolic or hyperbolic shapes. In some implementations, surfaces 321 and 322 are coated with a highly reflective material (e.g., a reflective metal, such as aluminum or silver), to provide a highly reflective optical interface. The cross-sectional profile of optical coupler 320 can be uniform along the length L of luminaire module 301. Alternatively, the cross-sectional profile can vary. For example, surfaces 321 and/or 322 can be curved out of the x-z plane.

The exit aperture of the optical coupler 320 adjacent upper edge of light guide 331 is optically coupled to edge 331 to facilitate efficient coupling of light from the optical coupler 320 into light guide 330. For example, the surfaces of a solid coupler and a solid light guide can be attached using a material that substantially matches the refractive index of the material forming the optical coupler 320 or light guide 330 or both (e.g., refractive indices across the interface are different by 2% or less.) The optical coupler 320 can be affixed to light guide 330 using an index matching fluid, grease, or adhesive. In some implementations, optical coupler 320 is fused to light guide 330 or they are integrally formed from a single piece of material (e.g., coupler and light guide may be monolithic and may be made of a solid transparent optical material).

The light guide 330 is formed from a piece of transparent material (e.g., glass material such as BK7, fused silica or quartz glass, or a transparent organic plastic, such as polycarbonate or acrylic) that can be the same or different from the material forming optical couplers 320. Light guide 330 extends over length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 330 from optical coupler 320 (with an angular range 125) reflects off the planar surfaces of the light guide by TIR and spatially mixes within the light guide. The mixing can help achieve illuminance and/or color uniformity, along the y-axis, at the distal portion of the light guide 332 at optical extractor 340. The depth, D, of light guide 330 can be selected to achieve adequate uniformity/mixing at the exit aperture (i.e., at end 332) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 320 are designed to restrict the angular range of light entering the light guide 330 (e.g., to within +/−40 degrees) so that at least a substantial amount of the light (e.g., 95% or more of the light) is optically coupled into spatial modes in the light guide 330 that undergoes TIR at the planar surfaces. Light guide 330 can have a uniform thickness T, which is the distance separating two planar opposing surfaces of the light guide. Generally, T is sufficiently large so the light guide has an aperture at first (e.g., upper) surface 331 sufficiently large to approximately match (or exceed) the exit aperture of optical coupler 320. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 320 and light guide 330 are formed from solid pieces of transparent optical material, hollow structures are also possible. For example, the optical coupler 320 or the light guide 330 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor.

The LEEs 310 may generate significant heat while operating. This heat is transferred into the structure nearby the LEEs including the substrate 312 and optical couplers 320 causing thermal expansion of those components. Depending on the materials of which these components are formed, relative expansion of these components may differ over at least a part of the temperature range experienced by the components. Accordingly, in some implementations, luminaire assemblies are constructed in a manner that thermal expansion of various components of the assembly does not result in damage to the luminaire module. For example, assemblies may be constructed so that differential thermal expansion of various components may be accommodated without misalignment of the light emitting elements with respect to their corresponding optical coupling element. Such implementations may be particularly beneficial in luminaire assemblies that extend significantly in one (or more) dimensions, where thermal expansion in the extended direction may be significant. Moreover, in addition to accommodating differential thermal expansion between different components, the construction of luminaire assemblies may be sufficiently robust to withstand mechanical shock, e.g., such as standard drop tests or impacts associated with shipping and installing light fixtures.

The housing 305 is used to provide, on one hand, a rigid base for securing other components of luminaire module 301 together, and on the other hand, a heat sink for extracting heat emitted by the plurality of LEEs 310. In this example, the housing 305 has a U-shaped profile in the x-z cross-section. In other examples, the housing 305 can have an L-shaped profile in the x-z cross-section.

For instance, both light guide 330 and substrate 312 can be secured to housing 305. The housing 305 may also include connectors and other mounting components. For example, housing 305 can include attachments for connecting to one or more cables for suspending the luminaire module 301 from a ceiling, or attachments for connecting the luminaire module to an adjustable mount (e.g., to the housing connector 176 of the adjustable mount 162 described above in connection with FIGS. 2A-2B). As another example, the housing 105 can include a support for attaching secondary reflectors to the luminaire module, as shown below in connection with FIGS. 4 and 5A-5B.

Moreover, the light guide 330 is secured to the housing 305 by fasteners (e.g., threaded fasteners, such as screws or bolts, etc.) Such fasteners can engage the light guide 330 via a plurality of holes in the housing 305 and/or in the light guide. Some of the holes are shaped to provide sliding fits for corresponding fasteners. Such holes can be formed as slits oriented along the y-direction to allow sliding of the light guide 330 along a portion of its length relative to the housing 305 during thermal expansion/contraction. Other tighter fitting hole/fastener combinations are used to accurately register the light guide 330 and the housing 305 in the luminaire module 301. Compared to locating a tight fitting hole/fastener combinations proximate an end of the light guide 330 (e.g., near y≈0 or y≈L), locating it halfway along the length of the light guide 330 (e.g., near y≈L/2) provides half the absolute length change during thermal expansion on either side of the tight fit. Luminaire assemblies with one light guide can use one tight fitting hole/fastener combination with the remaining hole/fastener combinations configured to allow sliding in y-direction.

In addition to providing mechanical support, the housing 305 may also function as a heat sink for the luminaire module 301. For example, the housing 305 may function as a passive heat exchanger that cools the luminaire module 301 by dissipating heat into the surrounding medium. Accordingly, in some implementations, the housing 305 includes a material that has a high thermal conductivity to facilitate heat dissipation. Such materials include, for example, certain metals, including (but not limited to) aluminum and aluminum alloys (e.g., alloys 1050A, 6061, or 6063) and copper. In some implementations, composite materials can be used. Examples are copper-tungsten pseudoalloy, AlSiC (silicon carbide in aluminum matrix), Dymalloy (diamond in copper-silver alloy matrix), and E-Material (beryllium oxide in beryllium matrix). Some composite materials may be sintered. Such housing 305 may be formed from a single piece of high thermal conductivity material, for instance, from a single piece of machined or extruded metal/metal alloy or from a single piece of cast matrix.

In other implementations, the housing 305 is composed of two or more different component materials. Here, the housing 305 is formed from a base material, providing mechanical strength (e.g., plastic that has been machined, molded, or extruded), coated with a layer of material having a high thermal conductivity to facilitate heat dissipation. Examples of such materials include those discussed above. The layer of material having high thermal conductivity is located proximate to substrate 312 to facilitate heat dissipation from the LEEs 310.

Further, the optical extractor 340 is also composed of a solid piece of transparent optical material (e.g., a glass material or a transparent organic plastic, such as polycarbonate or acrylic) that can be the same as or different from the material forming light guide 330. In the example implementation shown in FIG. 3A, the optical extractor 340 includes redirecting (e.g., flat) surfaces 342 and 344 and curved surfaces 346 and 348. The flat surfaces 342 and 344 represent first and second portions of a redirecting surface 343, while the curved surfaces 346 and 348 represent first and second output surfaces of the luminaire module 301.

Surfaces 342 and 344 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 342 and 344 provide a highly reflective optical interface for light having the angular range 125 entering an input end of the optical extractor from the output end 332 of the light guide 330. As another example, the surfaces 342 and 344 include portions that are transparent to the light entering at the input end of the optical extractor 340. Here, these portions can be uncoated regions (e.g., partially silvered regions) or discontinuities (e.g., slots, slits, apertures) of the surfaces 342 and 344. As such, some light is transmitted in the forward direction (along the z-axis) through surfaces 342 and 344 of the optical extractor 340 in an output angular range 125'. In some cases, the light transmitted in the output angular range is refracted. In this way, the redirecting surface 343 acts as a beam splitter rather than a mirror, and transmits in the output angular range 125' a desired portion of incident light, while reflecting the remaining light in angular ranges 135 and 135'.

In the x-z cross-sectional plane, the lines corresponding to surfaces 342 and 344 have the same length and form an apex or vertex 341, e.g. a v-shape that meets at the apex 341. In general, an included angle (e.g., the smallest included angle between the surfaces 344 and 342) of the redirecting surfaces 342, 344 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 3A, the output surfaces 346, 348 of the optical extractor 340 are curved with a constant radius of curvature that is the same for both. In an aspect, the output surfaces 346, 348 may have optical power (e.g., may focus or defocus light.) Accordingly, luminaire module 301 has a plane of symmetry intersecting apex 341 parallel to the y-z plane.

The surface of optical extractor 340 adjacent to the lower edge 332 of light guide 330 is optically coupled to edge 332. For example, optical extractor 340 can be affixed to light guide 330 using an index matching fluid, grease, or adhesive. In some implementations, optical extractor 340 is fused to light guide 330 or they are integrally formed from a single piece of material.

Other open and closed shapes of the luminaire module 301 are possible. FIG. 3B shows an example of a luminaire module 301' for which the light guide 330 has two opposing side surfaces 332a, 332b that form a cylinder shell of thickness T. Here, the x-y cross-section of the cylinder shell formed by the opposing side surfaces 332a, 332b is oval. In other cases, the x-y cross-section of the cylinder shell can be an arc of a circle or can have other shapes. For T=0.05D, 0.1D or 0.2D, for instance, light from multiple, point-like LEEs 310—distributed along a curved path of length L—that is edge-coupled into the light guide 330 at the receiving end can efficiently mix and become uniform (quasi-continuous) along such an elliptical path by the time it propagates to the opposing end. Note that a housing 305 of the luminaire module 301' is shaped in conformance with the shape of the cylindrical shell-shaped light guide 310.

FIG. 3C shows a luminaire module 301" that has (e.g., continuous or discrete) rotational symmetry about the forward direction (e.g., z-axis.) Here, a diameter T of the light guide 130 is a fraction of the distance D traveled by the guided light from the receiving end to the opposing end of the light guide 130. For example, the diameter of the light guide 130 can be T=0.05D, 0.1D or 0.2D, for instance. In some implementations, a housing 305 of the luminaire module 301" is configured as cylindrical shell, with a circular cross-section in the x-y plane. In other implementations, the housing 305 of the luminaire module 301" is configured as prismatic shell, with a polygonal cross-section in the x-y plane. For example, the polygonal cross-section can be a square, a hexagon, an octagon, etc.

Referring again to FIG. 3A, light exiting light guide 330 through end 332, during operation, impinges on the reflective interfaces at portions of the redirecting surface 342 and 344 and is reflected outwardly towards output surfaces 346 and 348, respectively, away from the symmetry plane of the luminaire module. The first portion of the redirecting surface 342 provides light having an angular distribution 135 towards the output surface 346, the second portion of the redirecting surface 344 provides light having an angular distribution 135' towards the output surface 346. The light exits optical extractor through output surfaces 346 and 348. In general, the output surfaces 346 and 348 have optical power, to redirect the light exiting the optical extractor 340 in angular ranges 145 and 145', respectively. For example, optical extractor 340 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 346 and 348 depends on the divergence of the light exiting light guide 330 and the orientation of surfaces 342 and 344.

Surfaces 342 and 344 may be oriented so that little or no light from light guide 330 is output by optical extractor 340 in certain directions. In implementations where the luminaire module 301 is attached to a ceiling of a room (e.g., the forward direction is towards the floor) such configurations can help avoid glare and an appearance of non-uniform illuminance.

Figure 3D:
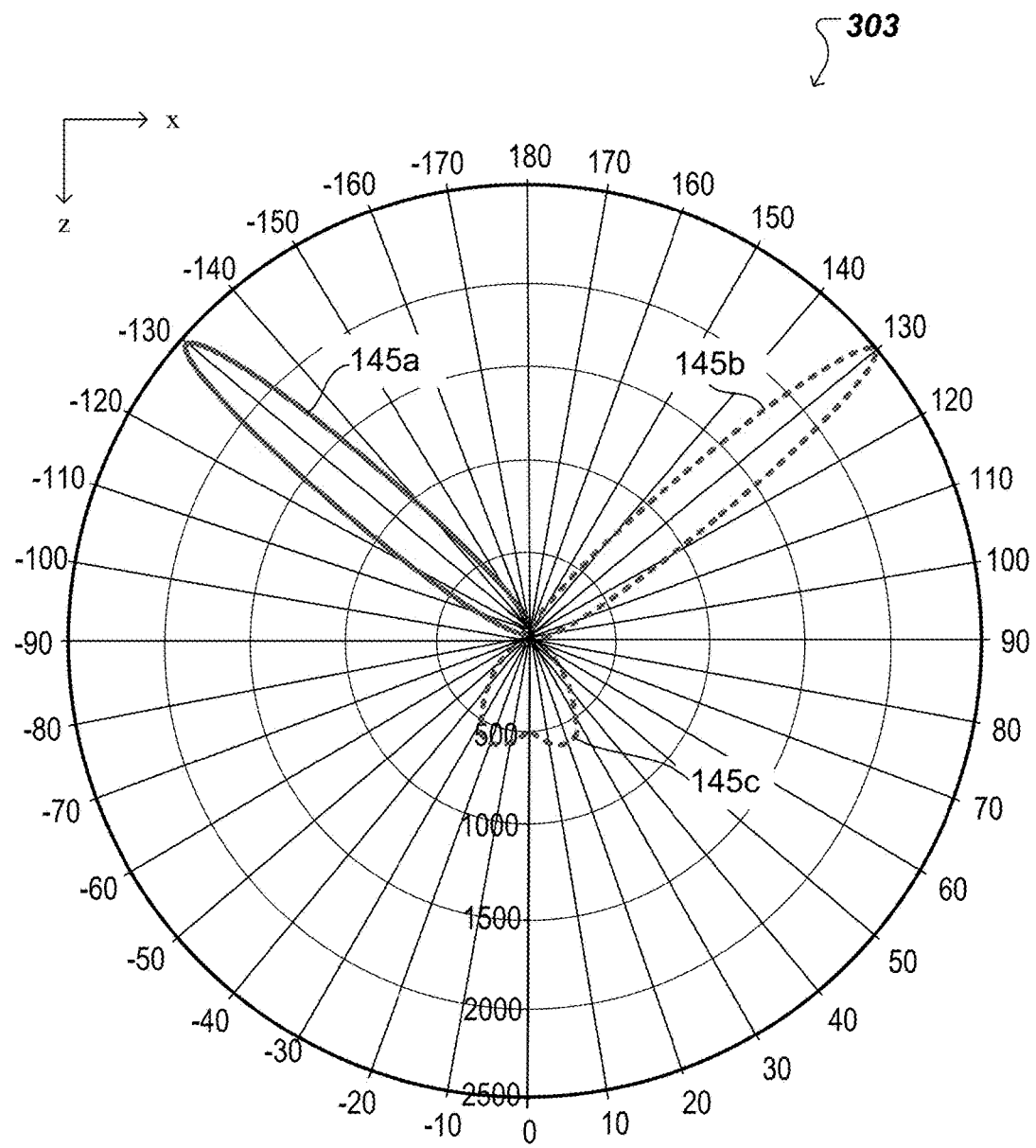

In general, the light intensity distribution provided by luminaire module 301 reflects the symmetry of the luminaire module's structure about the y-z plane. An example of light intensity distribution 303 corresponding to light output by the luminaire module 301 is shown in FIG. 3D. Here, light output in angular range 145' may correspond to a first output lobe 145a of a far-field light intensity distribution, light output in angular range 145 corresponds to a second output lobe 145b of the far-field light intensity distribution and light output (leaked) in angular range 125' corresponds to a third output lobe 145c of the far-field light intensity distribution. In general, the light intensity distribution 303 of luminaire module 301 will depend on the configuration of the optical coupler 320, the light guide 330 and the optical extractor 340. For instance, the interplay between the shape of the optical coupler 320, the shape of the redirecting surface 343 of the optical extractor 340 and the shapes of the output surfaces 346, 348 of the optical extractor 340 can be used to control the angular width and prevalent direction (orientation) of the first and second output lobes in the far-field light intensity profile. Additionally, a ratio of an amount of light in the combination of first and second output lobes and light in the third output lobe is controlled by reflectivity and transmissivity of the redirecting surfaces 342 and 344. For example, for a reflectivity of 90% and transmissivity of 10% of the redirecting surfaces 342, 344, 45% of light can be output in the output angular range 145' corresponding to the first output lobe 145a, 45% light can be output in the output angular range 145 corresponding to the second output lobe 145b, and 10% of light can be output in the output angular range 125' corresponding to the third output lobe 145c.

In some implementations, the orientation of the first and second output lobes can be adjusted based on the included angle of the v-shaped groove 341 formed by the portions of the redirecting surface 342 and 344. For example, a first included angle results in a far-field light intensity distribution with first and second output lobes located at relatively smaller angles compared to first and second output lobes of the far-field light intensity distribution that results for a second included angle larger than the first angle. In this manner, light can be extracted from the luminaire module 301 in a more forward direction for the smaller of two included angles formed by the portions 342, 344 of the redirecting surface 343.

Furthermore, while surfaces 342 and 344 are depicted as planar surfaces, other shapes are also possible. For example, these surfaces can be curved or faceted. Curved redirecting surfaces 342 and 344 can be used to narrow or widen the first and second output lobes. Depending of the divergence of the angular range 125 of the light that is received at the input end of the optical extractor, concave reflective surfaces 342, 344 can narrow the first and second lobes output by the optical extractor 340, while convex reflective surfaces 342, 344 can widen the first and second lobes output by the optical extractor 340. As such, suitably configured redirecting surfaces 342, 344 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 301 can be designed to output light into different output angular ranges 145, 145' from those shown in FIG. 3A. For example, in general, the first and second output lobes can have a width of up to about 90° (e.g., 80° or less, 70° or less, 60° or less, 50° or less, 40° or less, 30° or less, 20° or less). Moreover, the first and second output lobes are oriented at approx. −130° and approximately +130°. In general, first and second output lobes can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

In the example implementations described in connection with FIG. 3A, the luminaire module 301 is configured to output light into output angular ranges 145 and 145'. In other implementations (e.g., see FIG. 3E), a light guide-based luminaire module is modified to output light into a single output angular range 145'. Such light guide-based luminaire module configured to output light on a single side of the light guide is referred to as a single-sided luminaire module and is denoted 301*. FIG. 3E shows an example of a single-sided luminaire module 301* that is elongated along the y-axis. Also like the luminaire module 301, the single-sided luminaire module 301* includes a substrate 312 and LEEs 310 disposed on a surface of the substrate along the y-axis to emit light in a first angular range. As described above, the substrate 312 is affixed to a housing 305. The single-sided luminaire module 301* further includes optical couplers 320 arranged and configured to redirect the light emitted by the LEEs 310 in the first angular range into a second angular range 125 that has a divergence smaller than the divergence of the first angular range at least in the x-z cross-section. Also, the single-sided luminaire module 301* includes a light guide 330 to guide the light redirected by the optical couplers 320 in the second angular range 125 from a first end of the light guide to a second end of the light guide. Additionally, the single-sided luminaire module 301* includes a single-sided extractor (denoted 340*) to receive the light guided by the light guide 330. The single-sided extractor 340* includes a redirecting surface 344 to redirect the light received from the light guide 330 into a third angular range 135', like described for luminaire module 301 with reference to FIG. 3A, and an output surface 348 to output the light redirected by the redirecting surface 344 in the third angular range 135' into a fourth angular range 145'.

Referring now to FIG. 3E, a light intensity profile of the single-sided luminaire module 301* includes a single output lobe 145a. The single output lobe 145a corresponds to light output by the single-sided luminaire module 301* in the fourth angular range 145'.

Referring again to FIG. 3A, a luminaire module can include other features useful for tailoring the intensity profile. For example, in some implementations, luminaire assemblies can include an optically diffuse material that can diffuse light in a controlled manner to aid homogenizing the luminaire module's intensity profile. For example, surfaces 342 and 344 can be roughened or a diffusely reflecting material, rather than a specular reflective material, can be coated on these surfaces. Accordingly, the optical interfaces at surfaces 342 and 344 can diffusely reflect light, scattering light into broader lobes than would be provided by similar structures utilizing specular reflection at these interfaces. In some implementations these surfaces can include structure that facilitates various intensity distributions. For example, surfaces 342 and 344 can each have multiple planar facets at differing orientations. Accordingly, each facet will reflect light into different directions. In some implementations, surfaces 342 and 344 can have structure thereon (e.g., structural features that scatter or diffract light).

Surfaces 346 and 348 need not be surfaces having a constant radius of curvature. For example, surfaces 346 and 348 can include portions having differing curvature and/or can have structure thereon (e.g., structural features that scatter or diffract light). In certain implementations, a light scattering material can be disposed on surfaces 346 and 348 of optical extractor 340.

In some implementations, optical extractor 340 is structured so that a negligible amount (e.g., less than 1%) of the light propagating within at least one plane (e.g., the x-z cross-sectional plane) that is reflected by surface 342 or 344 experiences TIR at light-exit surface 346 or 348. For certain spherical or cylindrical structures, a so-called Weierstrass condition can avoid TIR. A Weierstrass condition is illustrated for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit circular structure without experiencing TIR. Light rays propagating within spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n2)(-\frac{1}{2})$, which is smaller than R/n, will be subject to small Fresnel reflection at the surface of radius R when exiting the circular structure. This condition may be referred to as Brewster geometry. Implementations may be configured accordingly.

In some implementations, all or part of surfaces 342 and 344 may be located within a notional Weierstrass surface defined by surfaces 346 and 348. For example, the portions of surfaces 342 and 344 that receive light exiting light guide 330 through end 332 can reside within this surface so that light within the x-z plane reflected from surfaces 342 and 344 exits through surfaces 346 and 348, respectively, without experiencing TIR.

Moreover, the emission spectrum of the luminaire module 301 corresponds to the emission spectrum of the LEEs 310. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 301. For example, a wavelength-conversion material may be disposed proximate the LEEs 310, adjacent surfaces 342 and 344 of optical extractor 340, on the exit surfaces 346 and 348 of optical extractor 340, and/or at other locations.

The layer of wavelength-conversion material (e.g., phosphor) may be attached to light guide 330 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n2)(-½)$, where R is the radius of curvature of the light-exit surfaces (346 and 348 in FIG. 3A) of the extractor 340 and n is the index of refraction of the portion of the extractor that is opposite of the wavelength-conversion material as viewed from the reflective surfaces (342 and 344 in FIG. 3A). The support structure may be a transparent self-supporting structure. The wavelength-conversion material diffuses light as it converts the wavelengths, provides mixing of the light and can help uniformly illuminate a surface of the ambient environment.

In the foregoing examples of standing lamps 100' and 100", luminaire modules (e.g., 101A*/101*B and 101A/101B, respectively) are supported by a stand 160, during operation, in an orientation in which the optical extractor (e.g., 140* and 140, respectively) is located between the base 168 of the stand and the LEEs 110. Other standing lamps are described next where luminaire modules are supported by a stand, during operation, in an orientation in which the LEEs are located between the base of the stand and the optical extractor.

Figure 4:
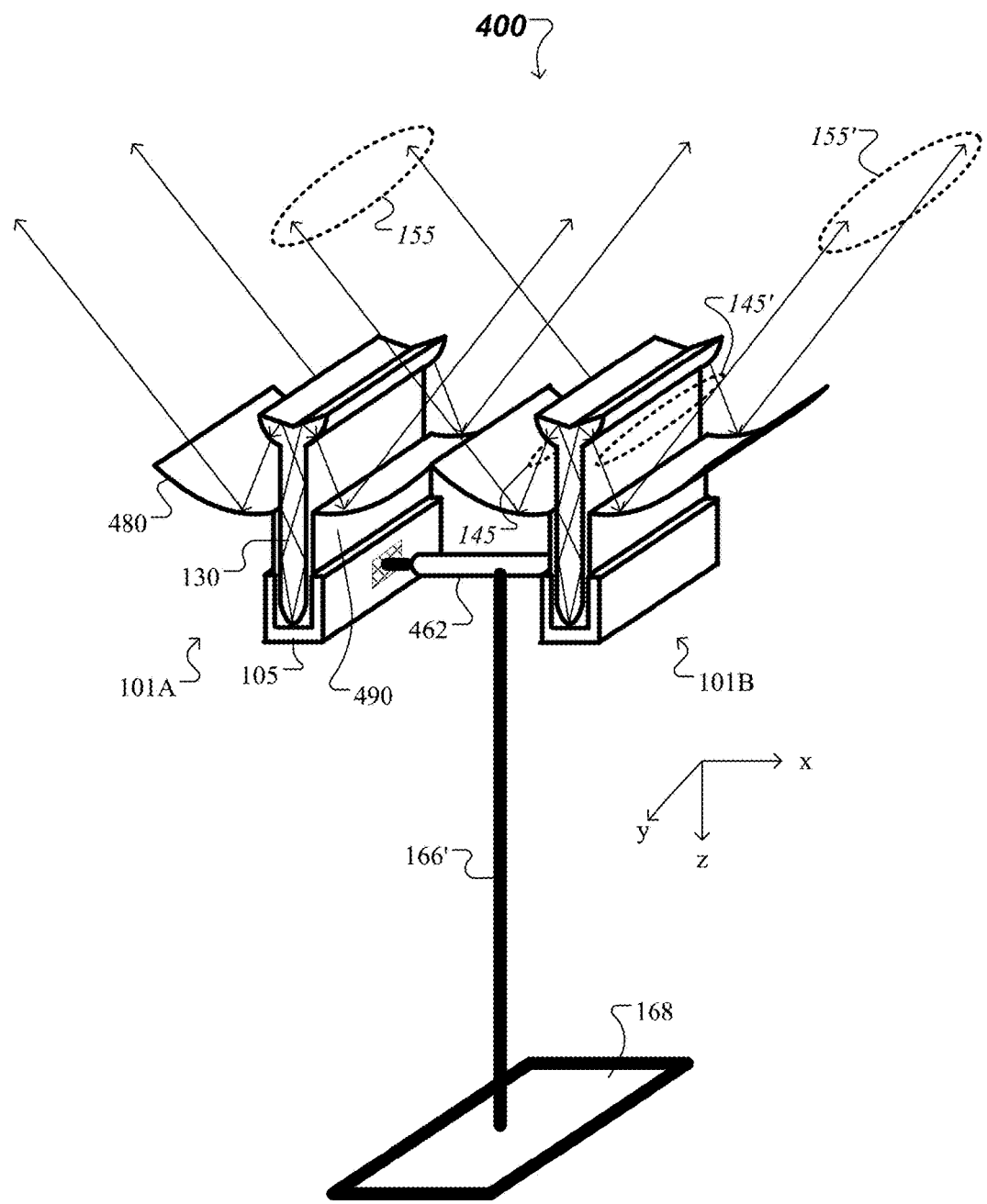
FIG. 4 is a perspective view of a standing lamp that includes multiple combinations of light guide luminaire modules and secondary reflectors.

FIG. 4 shows a standing lamp 400 that includes multiple combinations of luminaire modules and secondary reflectors. The standing lamp 400 includes two luminaire modules 101A and 101B, a stand with a base 168 and a column 166', and a stand mount 462. Here, the luminaire modules 101A, 101B are supported by the column 166' through the stand mount 462. Structural and functional aspects of the luminaire modules 101A and 101B have been described in detail in connection with FIG. 1C and FIG. 3A and will not be repeated here.

Moreover, the standing lamp 400 further includes at least one secondary reflector 480 for each of the luminaire modules 101A, 101B and corresponding adjustable reflector mounts 490. Here, a pair of secondary reflectors 480 is associated with each luminaire module 101A/101B, and each secondary reflector of the pair is supported, through an adjustable reflector mount 490, on a housing 105 of the luminaire module, along each of the two opposing side surfaces of a light guide 130 of the luminaire module. The secondary reflectors 480 have surfaces configured as specular reflecting surfaces or diffusely reflecting surfaces. Furthermore, the shape of the reflecting surfaces (in this instance, a concave shape) provides an additional degree of freedom for a designer to tailor the light distribution profile from the standing lamp 400.

In some implementations of the standing lamp 400, the stand mount 462 is adjustable in accordance with one or more of the translational or rotational degrees of freedom of the adjustable mount 162 described above in connection with FIGS. 2A-2B. For example, the housing 105 of the luminaire module 101A can be attached to the stand mount 462 at a first coupling point and the housing of the luminaire module 101B can be attached to the stand mount at a second coupling point spaced apart from the first coupling point by a separation Δ (see, e.g., FIG. 2A). In the example illustrated in FIG. 4, the housing 105 of the luminaire module 101A is attached at one end of the stand mount 462 and the housing of the luminaire module 101B is attached at the opposing end of the stand mount 462.

For each luminaire module 101A/101B, the light guide guides light from respective LEEs to its optical extractor (as illustrated antiparallel to the z-axis). The optical extractor of the luminaire module 101A/101B issues the guided light into an ambient environment into a first angular range 145 on one side of the light guide 130 (e.g., the left side) and into a second angular range 145' on the other, opposing side of the light guide (e.g., the right side). The secondary reflectors 480 are arranged and oriented relative to the light guide 130 to extend outward into the path of the light exiting each luminaire module 101A/101B in the first and second angular ranges 145 and 145'. In this manner, the secondary reflectors 480 intercept the light output by the luminaire module 101A/101B in the angular ranges 145 and 145' and to respectively redirect the intercepted light away from the standing lamp 400, in angular ranges 155 and 155'. Depending on the orientation the angular ranges 155 and 155' can be directed towards a ceiling, a wall, a floor or other surfaces and be used to provide indirect or direct illumination.

The separation Δ between the luminaire modules 101A and 101B can be adjusted such that light from one of the luminaire modules can clear the other luminaire module. That is, the luminaire modules 101A/B can be spaced or otherwise configured so they block little or none of each other's light emissions.

As each of the luminaire modules 101A and 101B of the standing lamp 400 has its LEEs located between its extractor and the base 168 of the stand, the standing lamp 400 can illuminate a target surface placed between the LEEs and the base indirectly, with light issued in the angular ranges 155 and 155'.

Adjustable reflector mounts with multiple degrees of freedom for repositioning and reorienting secondary reflectors relative to light guides of luminaire modules within a standing lamp are described below.

Figure 5A:
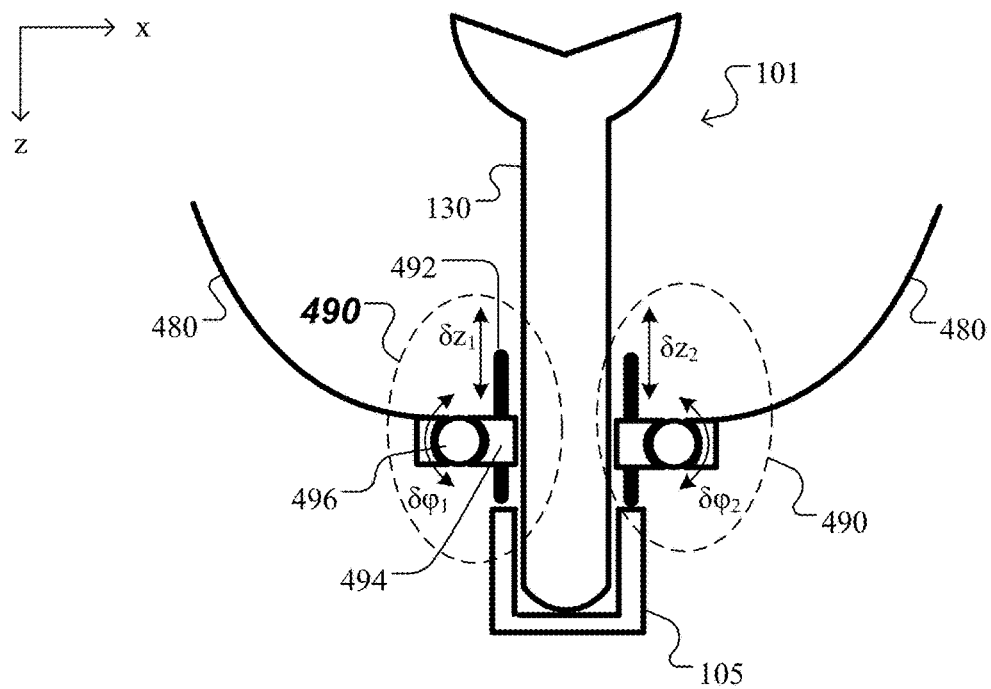
FIGS. 5A-5B show aspects of an example of an adjustable reflector mount used in a standing lamp like the one shown in FIG. 4, to adjustably arrange each luminaire module relative to corresponding one or more secondary reflectors.
Figure 5B:
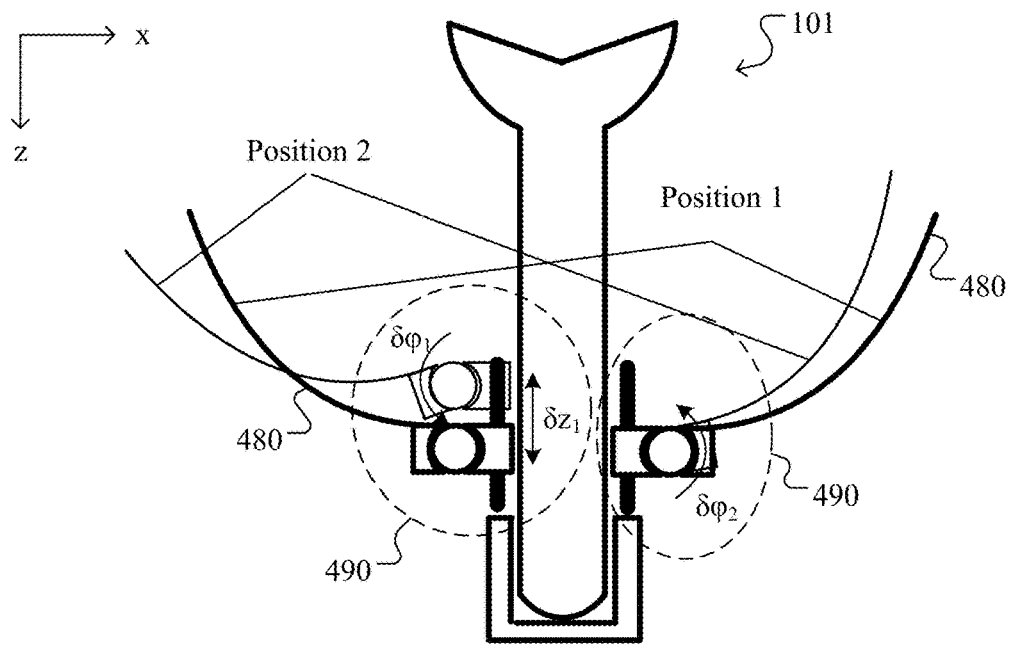

FIGS. 5A-5B show aspects of an example of an adjustable reflector mount 490 that can be used in a standing lamp, e.g., like the one shown in FIG. 4. In the example shown in FIG. 5A, the adjustable reflector mount 490 can adjustably rearrange and reorient a respective secondary reflector of the pair of secondary reflectors 480 associated with a luminaire module 101 relative to a light guide 130 of the luminaire module. Here, the adjustable reflector mount 490 includes a reflector mounting arm 492 and a reflector connector 494.

An edge of the reflector mounting arm 492 can be attached to the housing 105 of the luminaire module 101 using bolts, nuts, washers (or other fasteners) on one side of a light guide. Moreover, the reflector mounting arm 492 can extend along a side surface of the light guide 130 of the luminaire module 101 (e.g., along the z-axis) over a fraction (e.g., 10%, 30%, 50% or other fractions) of the depth of the light guide (e.g., depth D shown in FIGS. 3A-3C and 3E). In some implementations, e.g., as shown in FIG. 4, the reflector mounting arm 492 can extend (e.g., along the y-axis) over most of the length of the light guide 130 and of the secondary reflector 480 (e.g., length L shown in FIGS. 3A-3C and 3E).

The reflector connector 494 is used to connect an edge of the secondary reflector 480 to the reflector mounting arm 492 to arrange and orient the secondary reflector relative to the light guide 130. For example, the reflector connector 494 is translated along the reflector mounting arm 492 by using translational actuators. In some implementations, a reflector connector 494 that supports the secondary reflector 480 is translated by a vertical displacement $δz_j$, where j=1 or 2, with respect to the edge of the reflector mounting arm 492 attached to the housing 105. In other implementations, a relative distance Δz between the reflector connector 494 on one side of the light guide 130 that supports a first secondary reflector 480 of the pair of secondary reflectors associated with the luminaire module 101 and the reflector connector on the opposing side of the light guide that supports a second secondary reflector of the pair can be adjusted as necessary.

In addition, the reflector connector 494 includes a pivot 496. Here, the pivot 496 allows to rotate the secondary reflector 480 attached to the reflector connector 494 by an angular displacement $\delta\varphi_j$, where j=1 or 2, around a rotation axis parallel to the y-axis by using rotational actuators. In some implementations, the angular displacement $\delta\varphi_j$ is measured relative to a normal to the side surface of the light guide 130. In other implementations, a relative angle $\Delta\varphi$ between a normal to a given point of a first secondary reflector 480 of the pair of secondary reflectors associated with the luminaire module 101 (located on one side of the light guide 130) and a normal to a corresponding point of a second secondary reflector of the pair (located on the opposing side of the light guide).

FIG. 5B shows the secondary reflectors 480 of the luminaire module 101 in a first position, denoted Position 1, and in a second position, denoted Position 2. In Position 1, the secondary reflectors 480 associated with the luminaire module 101 mirror each other relative to a plane of symmetry that passes through the light guide and is parallel to the y-z plane. In Position 2, the first secondary reflector 480 on the left side of the light guide 130 has been rotated counterclockwise about the y-axis by an angular displacement $\delta\varphi_1$, and the second secondary reflector 480 on the right side of the light guide has been rotated clockwise about the y-axis by another angular displacement $\delta\varphi_2$. Equivalently, in Position 2, the first secondary reflector 480 on the left side of the light guide 130 has been rotated about a rotation axis parallel to the y-axis by an angular displacement $\delta\varphi_1$-$\delta\varphi_2$ relative to the second secondary reflector 480 on the right side of the light guide. In addition in Position 2, the first secondary reflector 480 on the left side of the light guide 130 has been moved by vertical displacement $\delta z1$ farther away from the edge of the reflector mounting arm 492 attached to the housing 105 of the luminaire module 101, or, equivalently, closer to the edge of the reflector mounting arm 492 adjacent to the two-sided optical extractor of the luminaire module 101.

Using the foregoing degrees of freedom available for the adjustable reflector mounts 490 included in the standing lamp 400, one can modify an intensity distribution output by the standing lamp 400.

A number of embodiments have been disclosed. Other embodiments are in the following claims.

What is claimed is:

1. A standing lamp, comprising:
   a stand comprising a base and column;
   first and second luminaire modules, each comprising
      a plurality of light emitting elements (LEEs) distributed along a first direction,
      a light guide extending along the first direction, the light guide comprising an input end and an output end, and two opposing side surfaces extending from the input end to the output end in a second direction orthogonal to the first direction,
      one or more optical couplers configured to couple light from the LEEs into the input end of the light guide,
      an optical extractor optically coupled to the output end of the light guide to receive light guided by the side surfaces of the light guide in the second direction, the optical extractor comprising a redirecting surface that is positioned to reflect at least some light from the light guide into a first angular range, and
      a housing configured to house at least the LEEs and to support the light guide; and
   a mount operatively coupling the first and second luminaire modules with the stand,
   wherein the first angular range has a component of a prevalent propagation direction that is antiparallel to the second direction, and
   wherein the standing lamp further comprises
      a reflector mount coupled with the housing of the first luminaire module, and
      a reflector coupled with the reflector mount and arranged to intercept light from the extractor of the first luminaire module in the first angular range and configured to reflect the intercepted light in a third angular range that has a component of a prevalent propagation direction that is parallel to the second direction.

2. The standing lamp of claim 1, further comprising a mounting arm having first and second ends, the first end being attached to the mount and the second end being attached to the stand.

3. The standing lamp of claim 1, wherein the mount is directly coupled to the stand.

4. The standing lamp of claim 1, wherein the housing of each luminaire module is connected to the mount.

5. The standing lamp of claim 1, wherein the mount is an adjustable mount configured to provide adjustment of at least one of the first and second luminaire modules.

6. The standing lamp of claim 5, wherein the adjustable mount allows for rotation of both the first and second luminaire modules about a respective axis.

7. The standing lamp of claim 6, wherein the axis for each luminaire module is parallel to the second direction.

8. The standing lamp of claim 5, wherein the adjustable mount allows for translation of both the first and second luminaire modules along a respective axis.

9. The standing lamp of claim 8, wherein the axis for each luminaire module is parallel to the first direction.

10. The standing lamp of claim 1, wherein the optical extractor of each luminaire module further comprises an output surface with a curved cross-section, the output surface arranged and configured to transmit the light in the first angular range to an ambient environment.

11. The standing lamp of claim 10, wherein the optical extractor of each luminaire module is a single-sided optical extractor.

12. The standing lamp of claim 10, wherein the optical extractor of each luminaire module is a double-sided optical extractor that further comprises
   a second redirecting surface which forms together with the redirecting surface a v-groove surface, the v-groove surface positioned with its apex facing the output end of the light guide, such that the second redirecting surface reflects at least some light from the light guide into a fourth angular range, and
   a second output surface with a curved cross-section, the second output surface arranged and configured to transmit the light in the fourth angular range to the ambient environment.

13. The standing lamp of claim 1, wherein
   the redirecting surface of the optical extractor of each luminaire module is a partially transmitting surface, such that at least a portion of the light from the light guide is transmitted through the redirecting surface in a second angular range that has a component of a prevalent propagation direction that is parallel to the second direction.

14. The standing lamp of claim 1, wherein the reflector mount is an adjustable reflector mount configured to provide adjustment of the reflector relative to the light guide of the first luminaire module.

15. The standing lamp of claim 14, wherein the adjustable reflector mount allows for rotation of the reflector about an axis parallel to the first direction.

16. The standing lamp of claim 14, wherein the adjustable reflector mount allows for translation of the reflector along an axis parallel to the second direction.

17. The standing lamp of claim 1, wherein
the optical extractor of each of the first and second luminaire modules is a double-sided optical extractor that outputs light in the first angular range and in a second angular range, each of the first and second angular ranges having a component of a prevalent propagation direction that is antiparallel to the second direction and another component antiparallel with each other, and
the standing lamp further comprises
three additional reflector mounts, two of the reflector mounts coupled with the housing of the first luminaire module on opposing sides of the light guide of the first luminaire module and two of the reflector mounts coupled with the housing of the second luminaire module on opposing sides of the light guide of the second luminaire module, and
three additional reflectors and respective reflector mounts, two of the reflectors associated with each luminaire module arranged to intercept light from the extractor of the luminaire module in the first angular range and configured to reflect the intercepted light in the third angular range that has a component of a prevalent propagation direction that is parallel to the second direction and two of the reflectors arranged to intercept the light from the extractor of the luminaire module in the second angular range and configured to reflect the intercepted light in a fourth angular range that has a component of a prevalent propagation direction that is parallel to the second direction and the other components of the prevalent propagation directions in the third and fourth angular ranges being antiparallel to each other.

18. The standing lamp of claim 1, wherein
the LEEs are located between the optical extractor and the base of the stand, and
the light in the third angular range indirectly illuminates a target surface located between the optical extractor and the base of the stand.

19. The standing lamp of claim 1, wherein the opposing side surfaces of the light guide are planar.

20. The standing lamp of claim 19, wherein the opposing side surfaces of the light guide are parallel.

21. The standing lamp of claim 1, wherein the LEEs are light-emitting diodes (LEDs).

22. The standing lamp of claim 21, wherein the LEEs are LEDs configured to emit white light.

23. The standing lamp of claim 1, wherein the each luminaire module extends between about six inches and 48 inches in the first direction.

* * * * *